United States Patent
Chung et al.

(10) Patent No.: US 6,597,482 B1
(45) Date of Patent: Jul. 22, 2003

(54) MULTIPLEXING/DEMULTIPLEXING APPARATUS FOR WAVELENGTH DIVISION MULTIPLEXED SYSTEM AND WAVELENGTH DIVISION MULTIPLEXED PASSIVE OPTICAL SUBSCRIBER NETWORKS USING THE SAME APPARATUS

(75) Inventors: Yun Chur Chung, Taejon (KR); Chang Hee Lee, Taejon (KR); Dae Kwang Jung, Masan-si (KR); Seung Kyun Shin, Taejun (KR)

(73) Assignee: Korea Advanced Institute of Science and Technology, Taejon (KR)

( * ) Notice: Subject to any disclaimer, the term of this patent is extended or adjusted under 35 U.S.C. 154(b) by 0 days.

(21) Appl. No.: 09/250,212

(22) Filed: Feb. 15, 1999

(30) Foreign Application Priority Data

Jul. 23, 1998 (KR) .............................. 98-29579

(51) Int. Cl.⁷ ............................................... H04J 14/02
(52) U.S. Cl. ...................................... 359/130; 359/125
(58) Field of Search ................................ 359/130, 124, 359/127, 125

(56) References Cited

U.S. PATENT DOCUMENTS

| | | | | |
|---|---|---|---|---|
| 5,311,344 A | * | 5/1994 | Bohn et al. ................. | 359/120 |
| 5,440,417 A | * | 8/1995 | Chung et al. ............... | 359/124 |
| 5,559,624 A | * | 9/1996 | Darcie et al. ............... | 359/118 |
| 5,907,417 A | * | 5/1999 | Darcie et al. ............... | 359/110 |
| 6,072,612 A | * | 6/2000 | Liou et al. .................. | 359/123 |
| 6,118,565 A | * | 9/2000 | Frigo ......................... | 359/127 |

OTHER PUBLICATIONS

*1998 OSA Technical Digest Series vol. 2*, Feb. 22 to 27, 1998 pp. 400–401.

* cited by examiner

*Primary Examiner*—Leslie Pascal
*Assistant Examiner*—Christina Y Leung
(74) *Attorney, Agent, or Firm*—Akin Gump Strauss Hauer & Feld, L.L.P.

(57) ABSTRACT

A multiplexing/demultiplexing apparatus used in wavelength division multiplexed passive optical subscriber networks comprises a multiplexing/demultiplexing means each having a natural number N input and output ports, wherein wavelength divided signals in one direction inputted through the N−1 input ports are multiplexed onto one output port, and simultaneously wavelength division multiplexed signals in the other direction inputted through the remainder one input port are demultiplexed onto the remainder N−1 output ports. According to the present invention it is possible to implement economical and efficient wavelength division multiplexed passive optical subscriber networks, by including two WGR's, one at the central office and one at the remote node to perform simultaneous multiplexing and demultiplexing of signals in upstream and downstream, and employing an erbium-doped fiber amplifier to be able to use a low-cost light source such as a light-emitting diode.

12 Claims, 3 Drawing Sheets

MULTIPLEXING/DEMULTIPLEXING APPARATUS FOR WAVELENGTH DIVISION MULTIPLEXED SYSTEM AND WAVELENGTH DIVISION MULTIPLEXED PASSIVE OPTICAL SUBSCRIBER NETWORKS USING THE SAME APPARATUS

BACKGROUND OF THE INVENTION

1. Field of the Invention

The present invention relates to a multiplexing/demultiplexing apparatus for wavelength division multiplexed system and wavelength division multiplexed passive optical subscriber networks using the same apparatus, and in particular to a multiplexing/demultiplexing apparatus, which performs simultaneous multiplexing and demultiplexing of signals in each direction using a multiplexing/demultiplexing means for economical implementation of the optical subscriber networks, and wavelength division multiplexed passive optical subscriber networks using the same apparatus.

2. Description of the Conventional Art

Wavelength division multiplexed (WDM) passive optical subscriber networks (PON's) offer the potential of large capacity, network security, and upgradability. However, these prior networks require low-cost sources, and efficient routing at the central office and remote nodes for practical implementation.

Generally, optical subscriber networks minimize the length of optical lines by using double-star structure. Namely, a connection between a central office and a remote node placed at the neighboring area of subscribers is made by one optical fiber, and connections between the remote node and each subscriber are made by individual optical fiber. Wavelength division multiplexed mode, in which each subscriber uses different wavelength from each other, can distinguish each subscriber using wavelength. The central office and remote nodes, therefore, need both a multiplexing apparatus that multiplexes wavelength divided optical signals and a demultiplexing apparatus that demultiplexes multiplexed optical signals. Such apparatuses use waveguide grating router (WGR) or devices with the same function as it.

The conventional wavelength division multiplexed passive optical subscriber networks are disclosed in the U.S. Pat. No. 5,550,666 entitled "Wavelength division multiplexed multi-frequency optical source and broadband incoherent optical source" and in the U.S. Pat. No. 5,574,584 entitled "Wavelength division multiplexing passive optical network with bi-directional optical spectral slicing".

In addition, as another conventional wavelength division multiplexed passive optical subscriber networks, there is the paper of Stuart S. Wagnar and Howard L. Lemberg, "Technology and system issues for a WDM-based fiber loop architecture", J. Lightwave Technol., vol. 7, no. 11, pp. 1759–1768, 1989.

The conventional wavelength division multiplexed passive optical subscriber networks need separate multiplexer and demultiplexer each in up direction and down direction for bi-directional communication. This causes to increase system costs and to waste system resources.

SUMMARY OF THE INVENTION

Accordingly, it is an object of the present invention to provide a multiplexing/demultiplexing apparatus for wavelength division multiplexed system, which is capable of implementing economical and efficient wavelength division multiplexed passive optical subscriber networks, and wavelength division multiplexed passive optical subscriber networks using the same apparatus, by employing two WGR's, one at the central office and one at the remote node, and performing simultaneous multiplexing and demultiplexing of signals in up and down direction.

To achieve the above object, there is provided a multiplexing/demultiplexing apparatus used in wavelength division multiplexed passive optical subscriber networks according to the present invention which includes a multiplexing/demultiplexing means each having N, a natural number, input and output ports, wherein wavelength divided signals in one direction inputted through the N−1 input ports are multiplexed onto one output port, and simultaneously wavelength division multiplexed signals in the other direction inputted through the remainder one input port are demultiplexed onto the remainder N−1 output ports.

To achieve another object, there are provided wavelength division multiplexed passive optical subscriber networks including a central office, and one or more remote nodes which are coupled to the central office by way of an optical fiber and further are coupled to a plurality of subscriber's units by way of an optical fiber, wherein the central office comprises: a first optical signal generating means for generating an optical signal; a multi-channel signal generating means for generating N−1 wavelength divided channel signals using the optical signal generated by the first optical signal generating means; N−1 modulating means each for modulating the channel signals generated by the multi-channel signal generating means; a first multiplexing/demultiplexing means each having N input and output ports, wherein wavelength divided signals inputted from the each modulating means through the N−1 input ports are multiplexed onto one output port, and simultaneously wavelength division multiplexed signals inputted from the remote node through the remainder one input port are demultiplexed onto the remainder N−1 output ports; and N−1 first detection means each coupled to said N−1 output ports of the first multiplexing/demultiplexing means for receiving the demultiplexed channel signals of said each subscriber, the remote nodes comprise: a second multiplexing/demultiplexing means each having N input and output ports, wherein wavelength division multiplexed signals inputted from the central office through one input port are demultiplexed onto N−1 output ports, and simultaneously signals inputted from the each subscriber's unit through the remainder N−1 input ports are multiplexed onto the remainder one output port, the subscriber's unit comprises: N−1 second detection means each for receiving the signals demultiplexed by the second multiplexing/demultiplexing means; and a second optical signal generating means for generating an optical signal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The embodiments of the present invention will be explained with reference to the accompanying drawings.

Figure 1:
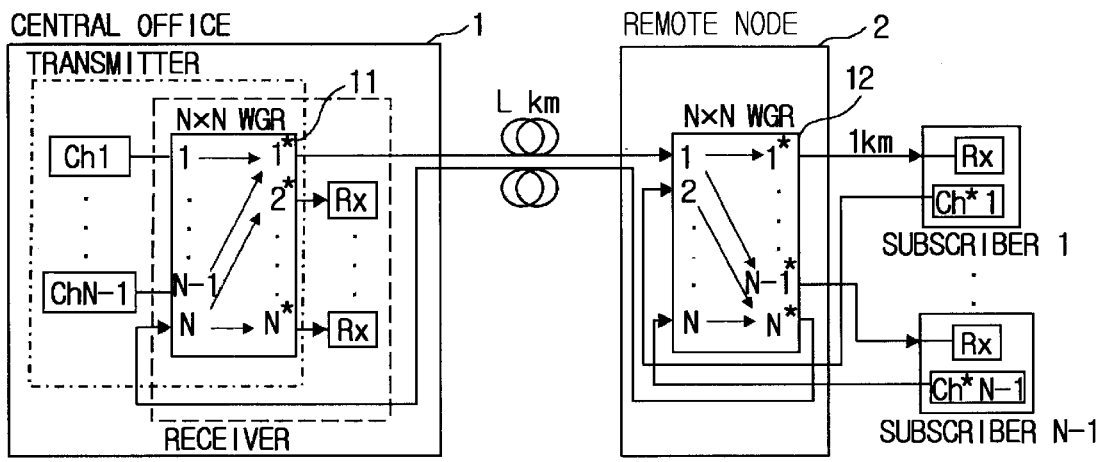
FIG. 1 is a block diagram illustrating a multiplexing/demultiplexing apparatus for wavelength division multiplexed system according to the present invention.

FIG. 1 is a block diagram illustrating a multiplexing/demultiplexing apparatus for wavelength division multiplexed system according to the present invention. The apparatus comprises a central office 1, a remote node 2, and waveguide grating routers (WGR) 11 and 12.

The present invention employs two N×N WGR's as multiplexing/demultiplexing means, one at the central office 1 and one at the remote node 2 for multiplexing and demultiplexing. Namely, the apparatus of the invention can perform simultaneous multiplexing and demultiplexing of channels in upstream and downstream using one N×N WGR, and thus transmit N−1 channels in each direction.

The structure of a multiplexing/demultiplexing apparatus of the present invention will be explained below with reference to the accompanying drawings.

The waveguide grating routers 11 and 12 multiplex the signals of the N−1 channels onto one output port, which are inputted through N−1 input ports, and simultaneously demultiplex the wavelength division multiplexed signal onto N−1 output ports, which is inputted through one input port. That is, the waveguide grating router 11 at the central office 1 multiplexes signals of N−1 wavelength divided downstream channels onto one output port 1*, which are inputted through N−1 input ports 1 to N−1. Simultaneously, the router 11 demultiplexes a signal of N−1 wavelength division multiplexed upstream channels onto the other N−1 output ports 2* to N*, which are inputted through the Nth input port.

Similarly, the waveguide grating router 12 at the remote node 2 demultiplexes a signal of N−1 wavelength division multiplexed downstream channels onto N−1 output ports 1* to N−1*, which is inputted through one input port 1. Simultaneously, the router 12 multiplexes N−1 upstream signals onto one output port N*, which are inputted through the other N−1 input ports 2 to N.

Such functions of the invention are done by utilizing device characteristics of a waveguide grating router that determines output ports according to the wavelength of optical signals inputted to input ports.

The operation of the multiplexing/demultiplexing apparatus of the present invention will be explained below.

The N−1 channels, which are inputted to N−1 input ports placed in front of the WGR, are multiplexed onto one output port placed in back of the WGR. Simultaneously, the multiplexed N−1 channels of the other direction, which are inputted to the remainder one input port placed in front of the WGR, are demultiplexed onto the remainder N−1 output ports placed in back of the WGR.

For example, as shown in FIG. 1, the multiplexed signal is outputted through output port 1* placed in back of the WGR 11. This is done by modulating N−1 downstream channels which transmit from the central office to each subscriber and have different wavelength from each other, and inputting the modulated signals to N−1 input ports 1 to N−1 placed in front of the WGR 11. The multiplexed N−1 downstream channels are inputted to an input port 1 placed in front of the WGR 12 at the remote node 2 through a single mode optical fiber with length L. After that, these channels are demultiplexed onto output ports 1* through N−1* placed in back of the WGR 12. Each of the demultiplexed downstream channels is transferred to a downstream receiver of each subscriber's site by way of single mode optical fibers which connect each port of the remote node 2 to each of N−1 subscribers.

Meanwhile, the N−1 upstream channels, which directly modulated according to the subscriber's information, are by turns inputted through the remainder N−1 input ports 2 to N placed in front of the WGR 12 at the remote node 2. After that, the inputted signals are multiplexed onto the remainder N* output port placed in back of the WGR 12. These N−1 upstream channels, multiplexed onto the N* output port, are inputted to the remainder Nth input port placed in front of the WGR 11 at the central office 1 by way of a single mode optical fiber. After that, the inputted signals are demultiplexed onto the remainder N−1 output ports 2* to N* placed in back of the WGR 11, and then are transferred to each upstream receiver.

Figure 2:
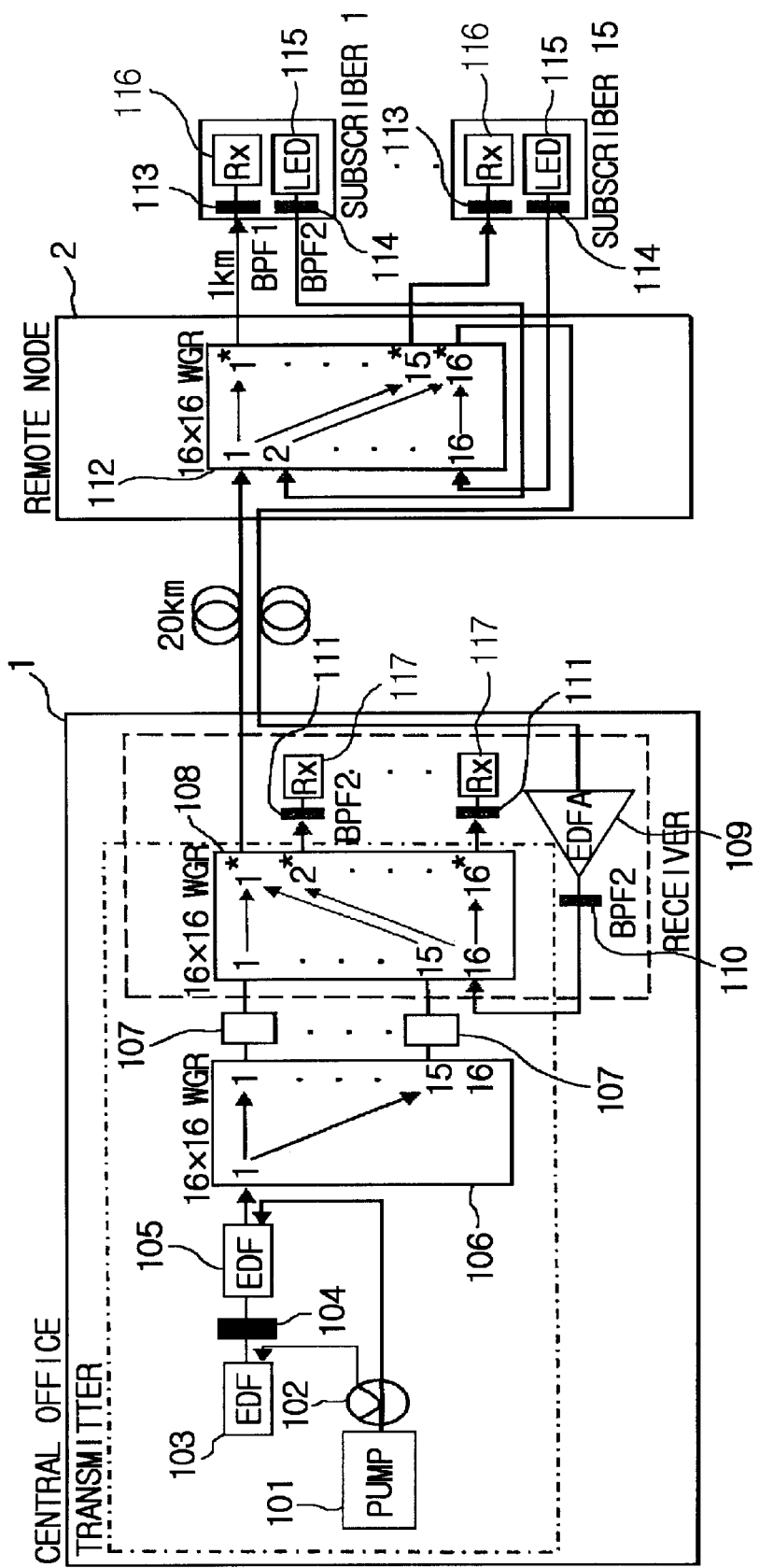
FIG. 2 is a block diagram illustrating wavelength division multiplexed passive optical subscriber network according to the present invention.

FIG. 2 is a block diagram illustrating wavelength division multiplexed passive optical subscriber networks, using a multiplexing/demultiplexing apparatus which simultaneously multiplexes and demultiplexes 15 channels in up and down directions by use of one 16×16 WGR, according to the present invention.

In FIG. 2, the symbol 101 is a pump laser diode, 102 is an optical divider, 103 and 105 are an erbium-doped fiber (EDF), 104, 110, 111, 113 and 114 are a band-pass filter (BPF), 106, 108 and 112 are a wave-guide grating router (WGR), 107 is a modulator, 109 is an erbium-doped fiber amplifier (EDFA), 115 is a light-emitting diode (LED), 116 is a APD receiver, and 117 is a PIN receiver In each WGR 106, 108 and 112 used at the central office 1 and the remote node 2, channel spacing is 100 GHz, bandwidth of each channel is 40 GHz, and an insertion loss is about 6-dB every connection. A spectrum-sliced fiber amplifier light source is used in downstream in order to confirm whether an economical wavelength division multiplexed light source can be used. That is, the pump 101 generates optical signals with 140 mW and 1.48 μm so as to allot them to each erbium-doped fiber 103 and 105 using the optical divider 102. In addition, the LED's 115 are used as light sources of each subscriber in upstream.

When the LED 's 115 are used as light sources for wavelength division multiplexed system as described above, and modulated at high speed, it is impossible to transmit the optical signals more than several Km due to low power of the LED. The erbium-doped fiber amplifier 109 of gain 25-dB, therefore, is used at the central office to compensate low power of upstream channel.

If the broadband light source with the bandwidth wider than one free spectral range (FSR) of the WGR is coupled to input port of the WGR for spectrum slicing, each spectrum-sliced channel at output port of the WGR has multiple passbands interspaced by one FSR of the WGR. The broad bandwidth of each channel induces the effect of dispersion and degrades receiver sensitivity. Therefore, it is impossible to transmit a fast-modulated channel at a long distance in the case of using these spectrum-sliced channels.

Accordingly, the bandwidth of the broadband light source should be limited to the bandwidth less than one FSR of WGR so as to let each channel spectrum to have only one passband. In addition, if upstream and downstream channels use the same wavelength band, a crosstalk caused by the channels of different direction can be generated at each channel. This crosstalk may be suppressed to a negligible level by using two types of band pass filters, which operate upstream and downstream channels at different wavelength band from each other and pass either upstream channel or downstream channel.

In order to prevent a significant degradation in the receiver sensitivity due to the effect of dispersion and crosstalk, the present invention includes two types of broadband pass filters in upstream and downstream, respectively. In these filters, an spacing between center wavelengths is a free spectral range of WGR and a passband is the same as the free spectral range of WGR.

In broadband pass filters (BPF1) 104 and 113 used at the downstream broadband light sources 101, 102, 103 and 105, and the downstream receiver 116 at each subscriber's site, their pass bands are 13.5 nm, their center wavelengths are 1553 nm, and their insertion losses are 2 dB. In broadband pass filters (BPF2) 114, 110 and 111 used at the upstream broadband light source 115, the fiber amplifier 109 of the central office and the upstream receiver 117, their passbands are 13.5 nm, their center wavelengths are 1540 nm, and their insertion losses are 2 dB.

Meanwhile, broadband light sources of 1.5 $\mu$m or 1.3 $\mu$m can be used in upstream and downstream. Otherwise, one in upstream or downstream can be a broadband light source of 1.5 $\mu$m, and the other 1.3 $\mu$m.

An optical signal generated by the broadband light source at the central office 1 is divided into 15 signals by way of a 16×16 WGR 106 to generate 15 spectrum-sliced channel signals.

Fourteen among 15 downstream channels, generated like the above, are directly inputted to each input port placed in front of the WGR 108 at the central office 1. A test channel is modulated with 500-Mbps using a LiNbO$_3$ modulator, and then is inputted to the remainder one input port of the WGR.

In upstream, fourteen among 15 upstream channels are inputted to each input port placed in front of the WGR 112 at the remote node 2. A test channel is directly modulated with 155-Mbps, and then is inputted to the remainder one input port in the WGR 112.

After all channels in upstream and downstream are passed through a 20-km single-mode fiber and an 1-km single-mode fiber, a bit-error-rate is measured each using APD receiver 116 and PIN receiver 117 with respect to each channel of downstream and upstream. The 20-km single-mode fiber couples the central office 1 to the remote node 2, and the 1-km single-mode fiber the remote node 2 to the respective subscribers.

As described above, the passive optical subscriber networks in accordance with the invention use the spectrum-sliced fiber amplifier light source using the optical fiber amplifier and the light-emitting diode, as light sources in downstream and upstream. Further, the networks can also use wavelength-selected distributed feedback lasers.

In addition, the transmission distance or speed of the downstream channels can be increased, by equipping output port 1* placed in back of the WGR 108 with the optical amplifier so as to increase the output power of the multiplexed downstream channels. Moreover, the central office 1 and the remote node 2 can respectively include directional couplers in order to transmit upstream and downstream signals operating at different wavelength band from each other using single optical fiber between them.

Figure 3:
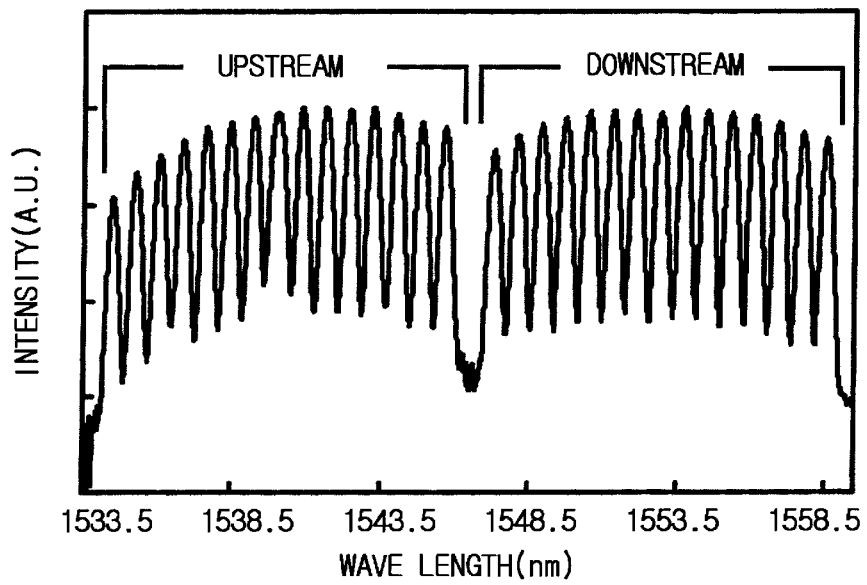
FIG. 3 is a graph illustrating an optical spectrum of upstream channel and downstream channel multiplexed by wavelength division.

FIG. 3 is a graph illustrating an optical spectrum of upstream channel and downstream channel multiplexed by wavelength division.

Because all channels in upstream and downstream are generated by spectrum-slicing the broadband light source with the WGR, the shape of spectrum of each channel is the same as that of each port of the WGR. Wavelength division multiplexed 15 downstream channels are centered at 1553 nm and 15 upstream channels are centered at 1540 nm, by the broadband pass filters BPF1 and BPF2 used at each direction.

The simultaneous use of WGR's as multiplexers and demultiplexers as in the proposed networks could result in serious crosstalk-induced penalties due to the signals traversing in opposite direction. For example, the signal power incident on the receiver at the subscriber's site is about −34 dBm, while the total power from 15 LED's incident on the same receiver is about −24 dBm. Thus, when the band-pass filters BPF1 are not used, it would be impossible to receive the downstream channels without serious penalties. By using the BPF1 at the subscriber's site, the crosstalk from these LED's are suppressed to about −56 dBm. The band-pass filters BPF2 are also used at the central office in front of the PIN receivers to suppress the crosstalk caused by the downstream channels.

Figure 4:
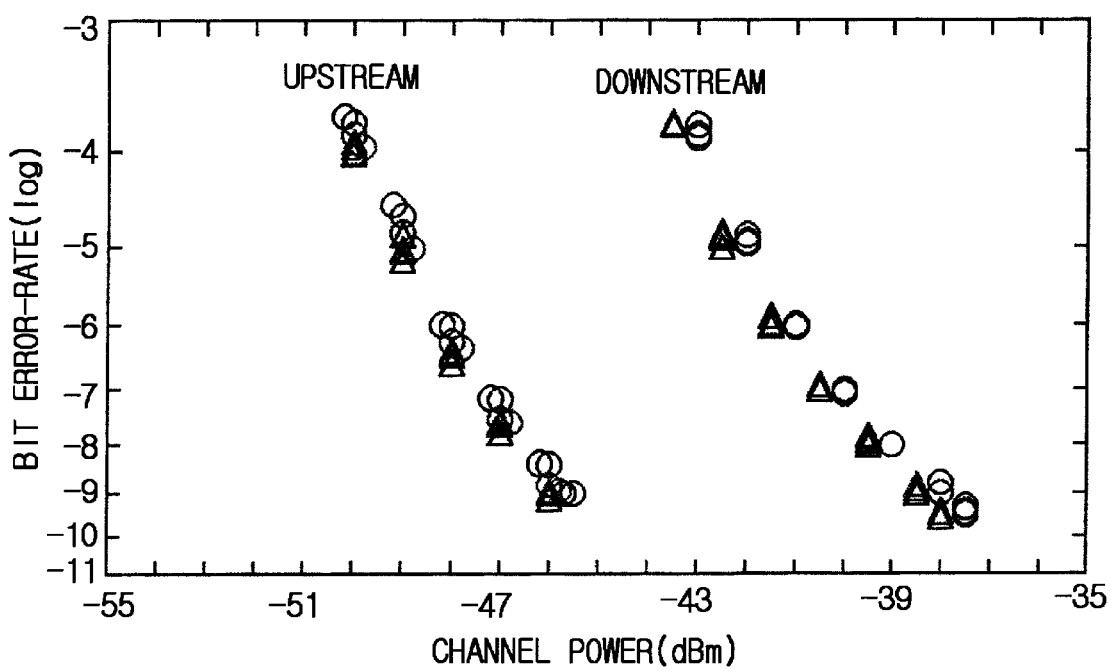
FIG. 4 is a diagram illustrating a bit-error-rate of upstream channel and downstream channel.

FIG. 4 is a diagram illustrating a bit-error-rate of upstream channel and downstream channel.

Namely, FIG. 4 represents a bit-error-rate measured according to the optical power of channel which is received using the APD receiver in downstream. In upstream channel, FIG. 4 represents a bit-error-rate measured according to the optical power of each channel which is inputted to the optical amplifier at the central office using the PIN receiver.

Here, the triangles ($\Delta$) represent the bit-error-rate curves measured channel by channel in back-to-back transmission. The circles ($\bigcirc$) represent the bit-error-rate curves measured after transmission through 21 km of single mode optical fiber, while the networks are fully loaded with 15 downstream and upstream channels.

As described above, in the present invention it is possible to implement economical and efficient wavelength division multiplexed passive optical subscriber networks, by including two WGR's, one at the central office and one at the remote node to perform simultaneous multiplexing and demultiplexing of signals in upstream and downstream, and employing an erbium-doped fiber amplifier to be able to use a low-cost light source such as a light-emitting diode.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A wavelength division multiplexed passive optical subscriber network including a central office, and at least one remote node which is coupled to the central office by way of at least one first optical fiber and further is coupled to a plurality of subscriber's units by way of at least one second optical fiber, the maximum number of said subscriber's units being N−1 where N is a natural number, wherein
(i) said central office comprises:
a first optical signal generating means for generating an optical signal;
a multi-channel signal generating means for generating N−1 wavelength divided channel signals using the optical signal generated by said first optical signal generating means;

N−1 modulating means each for modulating the channel signals generated by said multi-channel signal generating means;

a first N×N multiplexing/demultiplexing means having N input ports and N output ports, wherein wavelength divided downstream signals, inputted from each of said N−1 modulating means through N−1 of the N input ports and not through one remaining input port among the N input ports, are multiplexed onto one output port among the N output ports and not onto N−1 remaining output ports of the N output ports, and simultaneously, multiplexed upstream signals inputted from said remote node through the one remaining input port among the N input ports are demultiplexed onto the N−1 remaining output ports of the N output ports; and N−1 first detection means each coupled to said N−1 remaining output ports of said first N×N multiplexing/demultiplexing means for receiving the demultiplexed channel signals of each subscriber's unit;

(ii) said remote node comprises:

a second N×N multiplexing/demultiplexing means having N input ports and N output ports, wherein the multiplexed downstream signals inputted from the one output port of the first N×N multiplexing/demultiplexing means through one input port of the second N×N multiplexing/demultiplexing means are demultiplexed onto N−1 output ports of the second N×N multiplexing/demultiplexing means, and simultaneously, signals inputted from said subscriber's units through the N−1 remaining input ports of the first N×N multiplexing/demultiplexing means are multiplexed onto the one remaining output port of the second N×N multiplexing/demultiplexing means and then transmitted to the one remaining input port of the first N×N multiplexing/demultiplexing means as the multiplexed upstream signals, and (iii) each subscriber's unit comprises:

a second detection means for receiving the signals demultiplexed by said second N×N multiplexing/demultiplexing means; and a second optical signal generating means for generating an optical signal, wherein, first band-pass filters (BPF1) are used in the first optical signal generating means and the second detection means, and second band-pass filters (BPF2) are used in the second optical signal generating means and each of the N−1 first detection means, said first and second band-pass filters (BPF1 and BPF2) having a center wavelength different from each other to limit the spectrum band of said first and second optical signal generating means, so that wavelength bandwidths of downstream signals transmitted from said central office to said remote node and upstream signals transmitted from said remote node to said central office are different from each other.

2. The network of claim 1, wherein each of said first and second N×N multiplexing/demultiplexing means is a waveguide grating router.

3. The network of claim 2, wherein said first and second band-pass filters (BPF1 and BPF2) have pass bands identical with a free spectral range of said waveguide grating router, and center wavelengths of said first and second band-pass filters (BPF1 and BPF2) are apart from each other more than said free spectral range of said router.

4. The network of claim 3, wherein said first and second optical signal generating means use a 1.5 $\mu$m broadband light source.

5. The network of claim 3, wherein said first and second optical signal generating means use a 1.3 $\mu$m broadband light source.

6. The network of claim 3, wherein one of said first and second optical signal generating means uses a 1.5 $\mu$m broadband light source and the other uses a 1.3 $\mu$m broadband light source.

7. The network of claim 1, wherein said central office further includes a first amplifying means for amplifying signals multiplexed by said second N×N multiplexing/demultiplexing means in said remote node and supplying them to one input port of said first N×N multiplexing/demultiplexing means.

8. The network of claim 7, wherein said first amplifying means comprises an erbium-doped fiber amplifier and the second band-pass filter (BPF2).

9. The network of claim 7, wherein said central office further includes a second amplifying means for amplifying signals multiplexed by said first N×N multiplexing/demultiplexing means and transferring them to said remote node by way of the first optical fiber.

10. The network of claim 1, wherein said first and second optical signal generating means are a plurality of wavelength-selected distributed feedback lasers.

11. The network of claim 1, wherein said first and second optical signal generating means include light-emitting diodes.

12. The network of claim 1, wherein said central office and remote node further includes a directional coupler for bidirectional communication by way of the first optical fiber.

* * * * *